United States Patent
Goethijn et al.

(10) Patent No.: US 12,465,273 B2
(45) Date of Patent: Nov. 11, 2025

(54) LIGHT SHIELDING SYSTEM FOR AN ELECTRORETINOGRAM AND METHOD OF SHIELDING AT LEAST ONE EYE FROM INCIDENT LIGHT

(71) Applicants: UNIVERSITAIR ZIEKENHUIS ANTWERPEN, Edegem (BE); UNIVERSITEIT ANTWERPEN, Antwerp (BE)

(72) Inventors: Frank Goethijn, Ghent (BE); Stijn Verwulgen, Schoten (BE); Rose-Marie Erica Smets, Merksem (BE); Carina Koppen, Borgerhout (BE); Annelies Goossens, Stekene (BE); Tanja Coeckelbergh, Duffel (BE)

(73) Assignees: UNIVERSITAIR ZIEKENHUIS ANTWERPEN, Edegem (BE); UNIVERSITEIT ANTWERPEN, Antwerp (BE)

( * ) Notice: Subject to any disclaimer, the term of this patent is extended or adjusted under 35 U.S.C. 154(b) by 479 days.

(21) Appl. No.: 17/928,131

(22) PCT Filed: May 25, 2021

(86) PCT No.: PCT/EP2021/063829
§ 371 (c)(1),
(2) Date: Nov. 28, 2022

(87) PCT Pub. No.: WO2021/239697
PCT Pub. Date: Dec. 2, 2021

(65) Prior Publication Data
US 2023/0218222 A1 Jul. 13, 2023

(30) Foreign Application Priority Data
May 29, 2020 (EP) ..................... 20177534

(51) Int. Cl.
*A61B 5/398* (2021.01)
*A61B 3/00* (2006.01)
(Continued)

(52) U.S. Cl.
CPC ............ *A61B 5/398* (2021.01); *A61B 3/0008* (2013.01); *A61B 3/0083* (2013.01); *A61B 50/26* (2016.02);
(Continued)

(58) Field of Classification Search
CPC ..... A61B 5/398; A61B 3/0008; A61B 3/0083; A61B 5/6821; A61B 2562/185
See application file for complete search history.

(56) References Cited

U.S. PATENT DOCUMENTS

2018/0279870 A1* 10/2018 Walsh ................... A61B 3/102

FOREIGN PATENT DOCUMENTS

| EP | 0098087 A2 | 1/1984 |
| EP | 2853937 A1 | 4/2015 |
| GB | 2566275 A | 3/2019 |

OTHER PUBLICATIONS

Search Report from corresponding European Application No. 20177534.3, Dec. 4, 2020.
(Continued)

*Primary Examiner* — Christian Jang
(74) *Attorney, Agent, or Firm* — Workman Nydegger

(57) ABSTRACT

A light shielding system configured to shield at least one eye of a patient from incident light for an electroretinogram includes a substantially lighttight shielding box enclosing an inner space arranged to receive a handheld Ganzfeld stimulator, which box is mountable over the at least one eye of the patient; the box including at least one sleeve extending into the box to allow manipulation of the Ganzfeld stimulator.

15 Claims, 5 Drawing Sheets

(51) Int. Cl.
- *A61B 5/00* (2006.01)
- *A61B 5/297* (2021.01)
- *A61B 50/26* (2016.01)

(52) U.S. Cl.
CPC ............. *A61B 5/0077* (2013.01); *A61B 5/297* (2021.01); *A61B 5/6821* (2013.01); *A61B 2562/185* (2013.01)

(56) References Cited

OTHER PUBLICATIONS

International Search Report from PCT Application No. PCT/EP2021/063829, Aug. 13, 2021.

\* cited by examiner

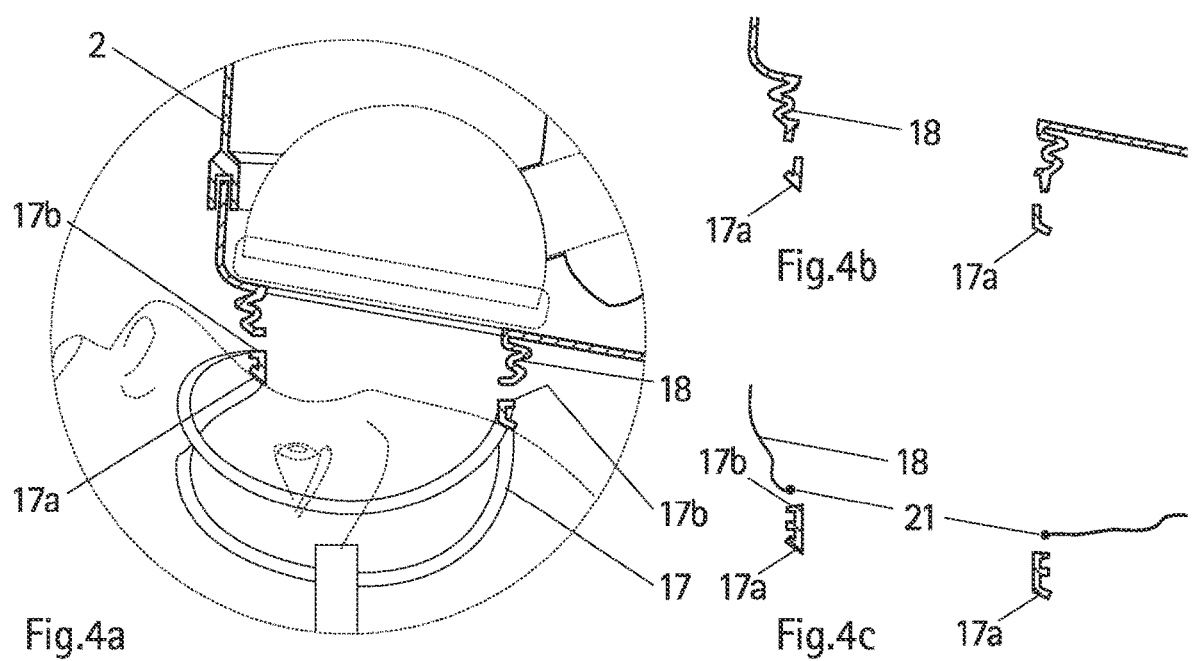

LIGHT SHIELDING SYSTEM FOR AN ELECTRORETINOGRAM AND METHOD OF SHIELDING AT LEAST ONE EYE FROM INCIDENT LIGHT

FIELD OF THE INVENTION

The present invention generally relates to a light shielding system configured to shield at least one eye of a patient from incident light, in particular for an electroretinogram (ERG), as well as to a method of shielding at least one eye of a patient from incident light.

BACKGROUND OF THE INVENTION

An electroretinogram (ERG) is a well-known neurophysiological test, which can provide important diagnostic information on a variety of retinal disorders. The test measures the stimulation of the entire retina with a flashlight source under dark-adapted (scotopic) and light-adapted (photopic) conditions. According to the standard guidelines of the International Society for Clinical Electrophysiology of Vision (ISCEV), it is required for the scotopic test phase to provide a dark adaptation of the eye for at least 20 minutes after which the eye is exposed to one or more flashes at given wavelengths. These flashes are generated by a Ganzfeld stimulator. There are generally two types of Ganzfeld stimulators: a large bowl Ganzfeld stimulator in which a patient can put his entire face and in which both eyes can be stimulated simultaneously, and a hand held stimulator unit or mini Ganzfeld stimulator which can cover a single eye of a patient.

One of the difficulties in carrying out an ERG using a Ganzfeld stimulator is that a patient needs to be able to keep in place and lie or sit still for a relatively long time. Experience has shown that this is possible for an adult, and even for very young babies up to five months if they are held by one of their parents. However, for babies and children between approximately five months and seven years old, such an ERG examination is very arduous and an examination under general anaesthetic may be required. However, the conditions of darkness imposed by the standard guidelines of the ISCEV for the scotopic test phase of the ERG are generally incompatible with the conditions of a general anaesthetic or with the environment of an operating theatre. It has proven cumbersome to create darkness in an operating theatre which is generally well illuminated. Moreover, a general anaesthetic requires the presence of an anesthetist who needs to monitor the state of the patient. He needs to have access to the nose and mouth of a patient through which oxygen or artificial respiration may be administered while the eyes need to be shielded from external light. However, the light emitted by screens present in the operating theatre have proven to be too strong with respect to the requirements of the scotopic test phase.

It is therefore an aim of the present invention to solve or at least alleviate one or more of the above-mentioned problems. In particular, the invention aims at providing a shielding system for at least one eye of a patient, which allows compliance with standard ISCEV guidelines for a scotopic test phase of an ERG while allowing safe monitoring of the patient's vital functions during anaesthetic.

SUMMARY OF THE INVENTION

To this aim, according to a first aspect of the invention, there is provided a shielding system. In particular, the shielding system is configured to shield at least one eye of a patient from incident light for an electroretinogram and comprises a substantially lighttight shielding box enclosing an inner space arranged to receive a hand-held Ganzfeld stimulator. The box is mountable over the at least one eye of the patient, preferably over both eyes simultaneously. The box includes at least one sleeve extending into the box to allow manipulation of the Ganzfeld stimulator. In an inventive way, the system comprises an adjustable head connection assembly, which is adjustable on a patient's head, the connection assembly including at least one opening allowing the Ganzfeld stimulator to illuminate the at least one eye of the patient. Thanks to the adjustable head connection assembly having an opening for the at least one eye, the at least one eye can adapt to scotopic conditions within the box before illumination by the Ganzfeld stimulator. The head connection assembly is made adjustable to be usable with different people which all have a different head size or face shape, so that the head connection assembly matches or fits substantially any patient's head. In this way, scotopic conditions necessary for a scotopic test phase on an ERG can be limited to an inside of the shielding box while an environment, such as an operating theatre, can be enlightened as desired during anaesthetic.

The adjustable head connection assembly may preferably be detachably mountable to the shielding box. In this way, the adjustable head connection assembly can first be placed on, and be adjusted to, the head of a patient, before the head connection assembly can be connected to the shielding box, or before the shielding box can be mounted to the head connection assembly. Alternatively, the head connection assembly can at least partly be fixedly connected to the shielding box.

The adjustable head connection assembly can include an eye contour frame having a flexible face contact side which is arranged to conform to a patient's face. The eye contour frame can be shaped such that the frame can surround both eyes simultaneously, or one or each eye individually, as is the case for example for a spectacle frame. The eye contour frame can be shaped such as to exclude surrounding a patient's nose when the frame is connected a patient's head. The eye contour frame can have a first side, a face contact side, configured to contact a patient's face or head, and a second side which is connectable to the shielding box. The face contact side of the eye contour frame can for example be made of a flexible rubber, or of a flexible foam, or of a self-adjusting foam, or of any other suitable and flexible material known to the person skilled in the art.

The flexible face contact side of the eye contour frame can advantageously include a split rim. Such a split rim can include a first edge and a second edge, roughly shaped as a letter Y. The first edge may be configured to be turned outwardly, i.e. away from a patient's eye, and a second edge may be configured to be turned inwardly, i.e. towards a patient's eye when the face contact side of the eye contour frame is brought into contact with a patient's face. Such a split rim can improve light tightness of the shielding box. In particular, the split rim can prevent incident light from being transmitted by a patient's skin under the eye contour frame and into the shielding box. Alternatively, the flexible face contact side of the eye contour frame may for example have an enlarged face contact side.

It is preferred that the adjustable head connection assembly can include a flexible cover arranged to avoid light incidence between the eye contour frame and the shielding box. The flexible cover may be a substantially lighttight or light proof textile cover, or a substantially lighttight elastomeric cover, or a cover of any other flexible and lighttight or lightproof material. The flexibility of the cover can avoid any pressure on a patient's face and/or head when the shielding box is placed over at least one eye of a patient. The flexible cover may be directly connectable to the shielding box, and to the eye contour frame.

The flexible cover may for example form at least part of a lower side of the shielding box. In this way, the shielding box can be lowered closely to a patient's face, which can limit the space that needs to be shielded from light in a lighttight manner. Alternatively, the shielding box may include a substantially rigid lower side including an opening which is connectable to the opening of the adjustable head connection assembly, for example via the flexible cover or in any other way.

In an advantageous way, the flexible cover can for example include a rigid rim on which rim the shielding box may be mountable. The rigid rim can provide an efficient transition between the flexible cover and the shielding box, which can be rigid. A side wall of the shielding can for example be directly mounted onto the rim of the flexible cover, but other ways of mounting or connecting the shielding box on or to the flexible cover are possible as well. The flexible cover may be detachably mountable to the shielding box, or, alternatively, the flexible cover may be fixedly mounted to the shielding box. A detachable mounting can facilitate an installation of the shielding system, in particular, of the shielding box, over a patient's head. A fixed mounting of the flexible cover on the shielding box can improve light tightness. A detachable connection may for example include a magnetic connection, or a bellows seal connection, a form fitting connection, a wedge connection or any other connection known to the person skilled in the art.

It is preferred that the flexible cover can be detachably connectable to the eye contour frame. In this way, the eye contour frame can be placed on a patient's head without being hindered by the flexible cover and/or the shielding box. At the same time, placement of electrodes for the ERG may be placed around the at least one eye of the patient before or after placing the eye contour frame, and without being hindered by the cover and/or the shielding box. A detachable connection may for example include a magnetic connection, or a bellows connection, or keyed and or friction locked tapered connection, or any other suitable connection known to the person skilled in the art.

The shielding box can include at least one hatchway for wire access. Wire access may for example be needed for a wire connecting the hand-held Ganzfeld stimulator to an external power source. The lightproof hatchway may advantageously extend through the sleeve into the shielding box, or through any of the sides of the shielding box. A hatchway for wire access may also be provided for electrode wiring, for example in wall of the shielding box. Alternatively, electrode wiring may pass under the flexible face contact side of the eye contour frame if the wiring is relatively thin enough and if the flexibility of the face contact side can allow a light-tight and snugly fit around the electrode wire.

The shielding system can further comprise an infrared camera and a display, the infrared camera being mountable in the inner space of the shielding box and being connectable to the display placed outside of the shielding box. The infrared camera can allow a user of the Ganzfeld stimulator to monitor an inside of the shielding box on the display in spite of the required darkness inside the shielding box. The connection between the camera and the display may be a wired or wireless connection.

The shielding box, preferably an upper side of the box, may comprise a lid. The lid can allow checking of the positioning of electrodes on or around a patient's eye or checking the positioning of the adjustable head connection assembly when the shielding box has been placed at least partly over at least one eye of a patient. At the same time, the lid can allow relatively easy insertion of a handheld Ganzfeld stimulator into the inside of the shielding box. Alternatively, the Ganzfeld stimulator can be placed into the shielding box before connection of the head connection assembly to the shielding box or can be placed in the shielding box in a substantially permanent manner.

A shielding system can preferably further comprise a tripod to which the shielding box is mountable such that the shielding box is adjustable in height. The tripod can preferably be a movable tripod, for example on wheels so as to facilitate correct placement of the shielding system with respect to the patient. The shielding box may for example be attached to the tripod and may be adjustable in height, so that the box may for example be lowered over a patient's head, preferably when the adjustable head connection assembly has already been positioned on the patient's head.

According to a second aspect of the invention, there is provided a method of shielding at least one eye of a patient from incident light for an electroretinogram. The method can provide one or more of the above-mentioned advantages.

The present invention will be further elucidated with reference to figures of exemplary embodiments. Corresponding elements are designated with corresponding reference signs.

BRIEF DESCRIPTION OF THE DRAWINGS

FIGS. 3b and 3c show a cross-sectional view of the adjustable head connection assembly along the section line B-B' of FIG. 3a;

FIG. 4a shows an enlargement of FIG. 2 of the cross-sectional view of the adjustable head connection assembly;

FIGS. 4b and 4c show a cross-sectional view on alternatives for the connection between the flexible cover and the eye contour frame of the head connection assembly of FIG. 4a;

DETAILED DESCRIPTION OF EMBODIMENT(S)

Figure 1:
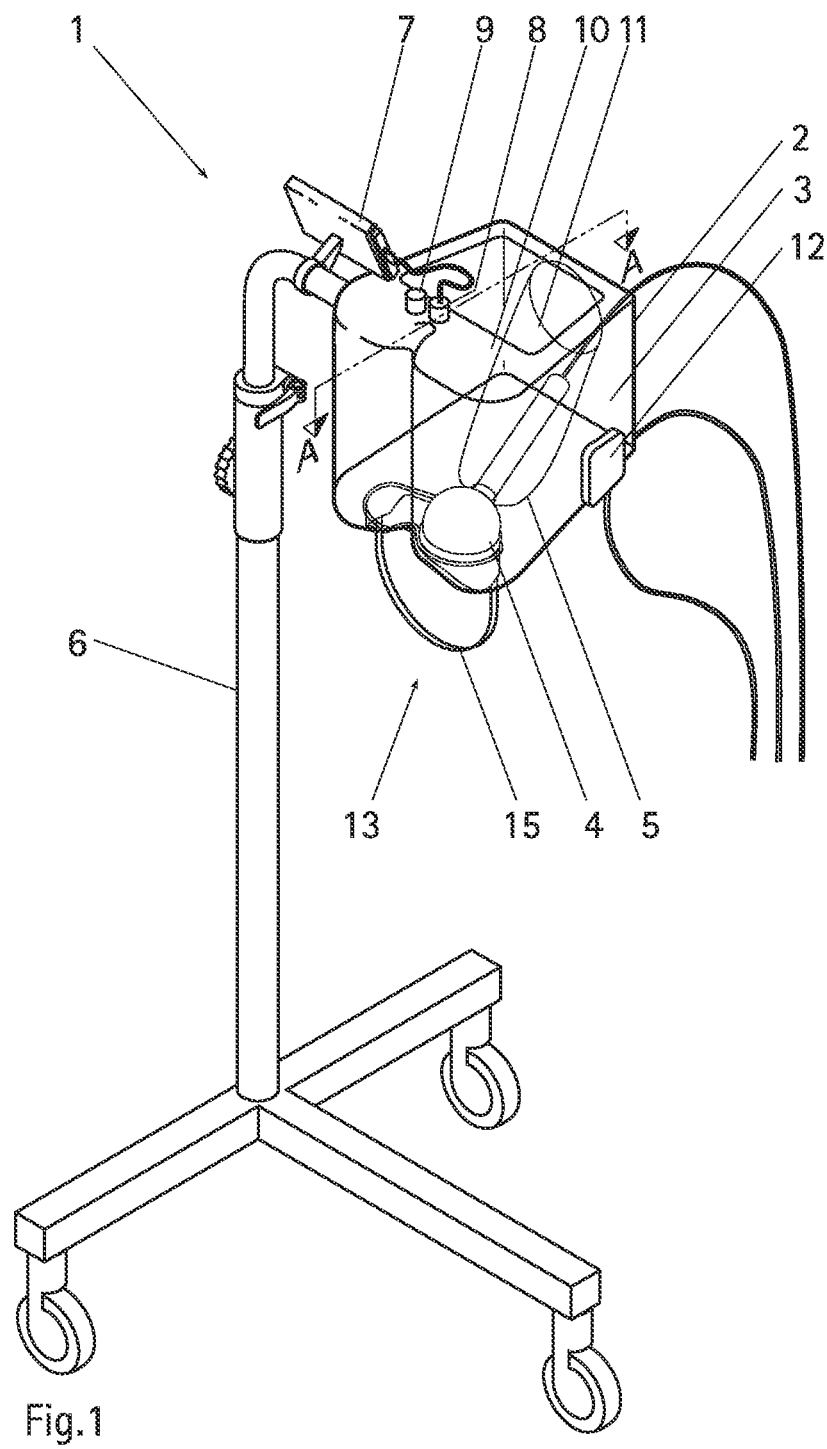
FIG. 1 shows a perspective view of a preferred embodiment of a light shielding system according to the invention.
Figure 2:
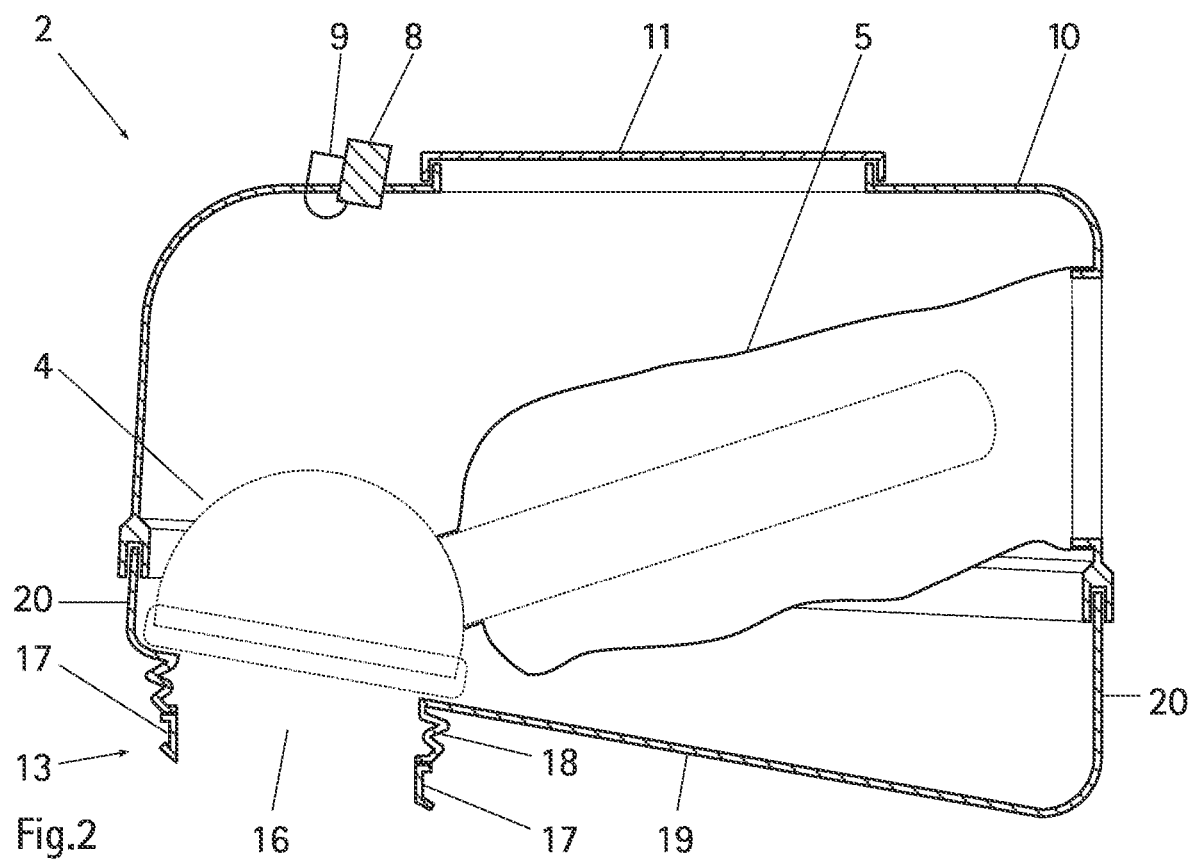
FIG. 2 shows a cross-sectional view of the shielding box along the section line A-A' shown in FIG. 1.

FIG. 1 shows a perspective view of a preferred embodiment of a light shielding system 1 according to the invention. The light shielding system 1 comprises a substantially lighttight shielding box 2 enclosing an inner space 3. The inner space 3 is arranged to receive a hand-held Ganzfeld stimulator 4, which may also be called a mini Ganzfeld stimulator. Thanks to the configuration of the shielding system 1, any known type of handheld Ganzfeld stimulator can be used with the present light shielding system, but the Ganzfeld stimulator is not part of the light shielding system. The box 2 includes at least one sleeve 5 extending into the box 2 to allow manipulation of the Ganzfeld stimulator 4, as is shown in FIG. 2. The system 1 can further comprise a tripod 6 to which the shielding box 2 is mountable such that the shielding box 2 is adjustable in height. The tripod 6 can be of any known type, and can be movable, for example on wheels, as shown, or in any other way. The shielding box 2 may be fixedly mounted to the tripod 6 or may be detachably mountable to the tripod 6. Adjustment in height of the shielding box 2 can for example be done by adjusting a height of the tripod or by adjusting a height of fixation of the shielding box 2 on the tripod 6, as is known to the person skilled in the art. The tripod 6 may also be arranged to allow substantially horizontal adjustment of the shielding box 2 with respect to the tripod 6, or any other adjusting movement. The system 1 can further comprise an infrared camera 8 and a display 7. The infrared camera 8 can for example be mountable in the inner space 3 of the shielding box 2 and can be connected, in a wired or wireless way, to the display 7 which is placed outside of the shielding box 2. Optionally, also infrared lighting 9 may be provided within the inner space 3 of the shielding box 2. The infrared lighting 9 may be a separate IR light or may for example be part of the infrared camera 8. The shielding box 2, preferably an upper side 10 of the box 2, can comprise a lid 11. The lid 11 can be opened, for example to check if all connections have been correctly made; and can be closed before operation of the Ganzfeld stimulator. The shielding box 2 can also include one or more lighttight hatchways 12 for wire access, for example for electrode wiring or for power of the camera 8 and/or the lighting 9. Such a hatchway may be provided in a side wall of the box 2, or in any other wall of the box 2. In an inventive way, the light shielding system 1 comprises an adjustable head connection assembly 13 which can be adjusted on a patient's head, for example by a headband 15, and which will be shown in more detail in FIGS. 3 and 4.

Figure 3A:
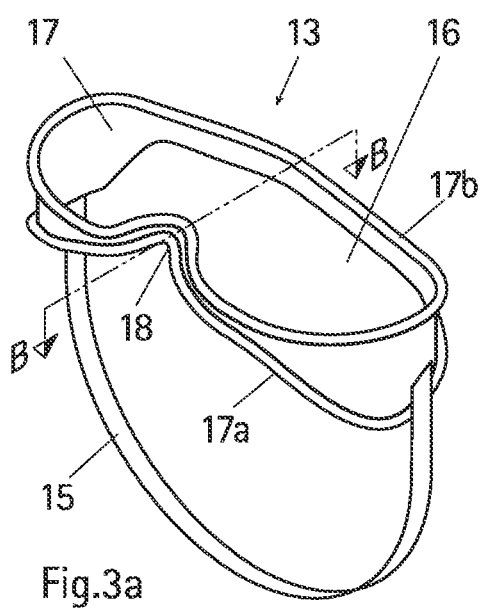
FIG. 3a shows a perspective view on an adjustable head connection assembly of the light shielding system of FIG. 1.

FIG. 2 shows a cross-sectional view of the shielding box 2 along the section line A-A' shown in FIG. 1. The Ganzfeld stimulator 4 has been drawn in a dotted line, since it is not part of the light shielding system 1. The shielding box 2 can be made at least partly of a hard plastic material, such as for example of PVC, ABS, PC, or of any other suitable material known to the person skilled in the art, while the sleeve 5 is preferably made of a flexible material, for example of silicone, EVA foam, EPDMA, or of any other suitable material known to the person skilled in the art. All these materials, as well as the joints, should be lighttight, so black material is preferred. Moreover, the material is preferably compatible with hygienic requirements. The adjustable head connection assembly 13 can take many different shapes but includes at least one opening 16 allowing the Ganzfeld stimulator 4 to illuminate the at least one eye of the patient. A handheld Ganzfeld stimulator 4 is usually configured to illuminate one eye at a time, so the opening 16 may be adjusted in size to such a handheld Ganzfeld stimulator for only one eye. Alternatively, the opening 16 of the head connection assembly may be large enough for both eyes of a patient to look into the shielding box simultaneously, which may be advantageous in terms of time for the eyes to adapt to scotopic conditions. The adjustable head connection assembly 13 can include an eye contour frame 17 as shown in FIG. 3a and can include an at least partly flexible cover 18 arranged to avoid light incidence between the eye contour frame 17 and the shielding box 2. The flexible cover 18 can for example form a sort of lighttight tunnel between the eye contour frame 17 and a lower side 19 of the shielding box, in which case the lower side 19 of the box 2 may be made of a hard material. The flexible cover 18 could also form at least part of the lower side 19 of the shielding box 2. The flexible cover could include a rigid rim 20 on which rim an upper part of the shielding box 2 is mountable. In that case, the shielding box 2 would have an open lower side 19.

FIG. 3a shows a perspective view on an adjustable head connection assembly of the light shielding system of FIG. 1. The headband 15 of the head connection assembly may be adjustable on a patient's head, for example with a scratch closure or any other type known to the person skilled in the art. The adjustable head connection assembly 13 can include an eye contour frame 17 having a flexible face contact side 17a which is arranged to conform to a patient's face. The side 17b of the eye contour frame 17 facing away from a patient's face may be configured to be connectable to the shielding box 2, either directly or via a flexible cover 18, as shown in FIGS. 2 and 4. The eye contour frame 17 may look like a pair of open goggles without glass having an indent 18 along the contour frame 17 allowing to pass around the nose of the patient to leave it free, which is important during anaesthetic. The eye contour frame 17 may optionally include an additional rib separating the large opening 16 into two parts, one for each eye.

Figure 3B:
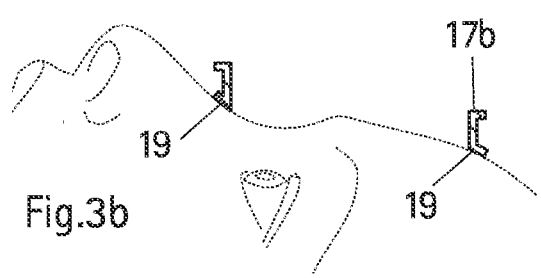
Figure 3C:
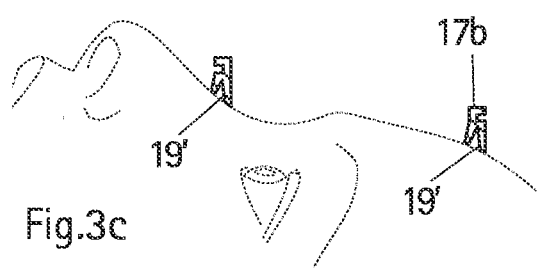

FIGS. 3b and 3c show a cross-sectional view of the adjustable head connection assembly along the section line B-B' of FIG. 3a. In order to avoid that incident light falling on the face of a patient outside of the eye contour frame 17 can be transmitted by the skin and still enter within the eye contour frame, the flexible face contact side 17a of the eye contour frame 17 may for example have a relatively large rim 19 configured to make contact with a patient's skin. Alternatively, the flexible face contact side 17a of the eye contour frame 17 may include a split rim 19'.

FIG. 4a shows an enlargement of FIG. 2 of the cross-sectional view of the adjustable head connection assembly 13. The adjustable head connection assembly 13 may be detachably mountable to the shielding box 2 or alternatively, the adjustable head connection assembly 13 may be fixedly mounted to the shielding box 2. In case the head connection assembly 13 includes a flexible cover 18, the flexible cover 18 may be detachably connectable to the eye contour frame 17. This connection may be realized in different ways, as shown in FIGS. 4a, 4b and 4c. The side 17b of the eye contour frame 17 facing away from a patient's face may include a flange, for example a magnetic flange, so that the flexible cover 18 may be magnetically connected to the flange 17b of the eye contour frame 17. Alternatively, the side 17b of the eye contour frame 17 might be conically shaped, as shown in FIG. 4b, so that the shielding box 2 or the flexible cover 18 may be form-fitted onto such a conically shaped rim 17b. In yet another embodiment, shown in FIG. 4c, a border of a flexible cover 18 might include an elastic element 21 which may be configured to be tightened around a flange 17b of the eye contour frame 17. Other ways of connecting the shielding box 2 or the flexible cover 18 to the eye contour frame 17 are possible as well. The flexible cover 18 may also be fixedly mounted to the shielding box 2, as shown in FIG. 4a, or may be detachably mountable to the shielding box 2. The shielding box 2 may be a one-piece box, or may include a detachable upper and lower part, which can for example be slid into one another.

Figure 5:
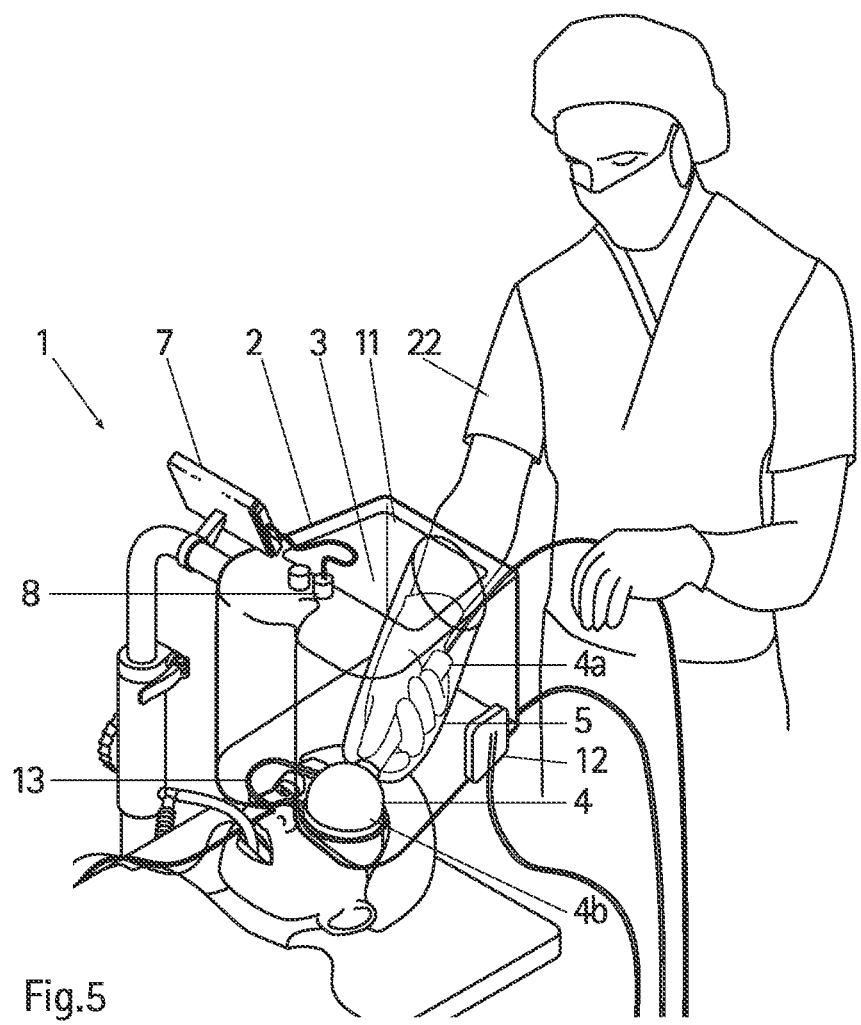
FIG. 5 shows a perspective view of the light shielding system of FIG. 1 in an operational environment.

FIG. 5 shows a perspective view of part of the light shielding system 1 of FIG. 1 in an operational environment. The light shielding system 1 can be used to perform the scotopic test phase of an ERG in compliance with standard ISCEV guidelines for this kind of tests. The light shielding system 1 may allow an ERG under general anaesthetic in an operating theatre, but the system can also be used to an advantage in any other room which may be difficult to be darkened. To shield at least one eye of a patient from incident light for an electroretinogram, a light shielding system 1 as described above is provided. Then the adjustable head connection assembly 13, in particular the eye contour frame 17 and the headband 15, is adjusted on a patient's head such that an opening 16 of the head connection assembly 13 is laid over at least one eye of the patient. Adjustment of the head connection assembly 13 can for example, but need not, be done before bringing the patient into anaesthesia. Electrodes for performing the ERG can be placed around the eye of the patient, before or after adjusting the eye contour frame 17. Wires of these electrodes can either pass under the flexible face contact side 17a of the eye contour frame 17 if small enough or through the opening 16 of the eye contour frame and then out of the shielding box 2 via a hatchway 12. The shielding box 2 may then be lowered over the patient's head. The shielding box 2 may then be connected to the adjustable head connection assembly 13 after adjusting the adjustable head connection assembly 13 on the patient's head. Via the lid 11 a hand-held Ganzfeld stimulator 4 can be introduced into the inner space 3 of the lighttight shielding box 2 and the grip 4a of the Ganzfeld stimulator can be put through the at least one sleeve 5 extending into the box 2. Before closing the lid 11, the positioning of the electrodes may be checked again. Once the shielding box 2 is in place and closed, adaptation of the eyes to the scotopic conditions inside the shielding box 2 may start. When a patient is brought under general anaesthetic, he may be intubated, and an anesthetist needs to have access to a patient's face, in particular to a patient's nose and mouth, which are not covered by the shielding box 2. The operator 22 of the Ganzfeld stimulator 4 can put his hand into the sleeve 5 and hold a grip 4a of the Ganzfeld stimulator 4, which grip 4a extends into the sleeve 5. The head 4b of the Ganzfeld stimulator is in the inner space 3 of the lighttight shielding box 2 and can be configured to emit flashes into an eye of the patient. Thereto, the connection assembly 13 includes at least one opening 16 allowing the Ganzfeld stimulator 4 to illuminate the at least one eye of the patient. Thanks to the infrared camera 8, the operator 22 can follow the handling of the Ganzfeld stimulator 4 within the shielding box 2 on the display 7 placed outside of the shielding box 2. So the present lighttight shielding system and method of shielding at least one eye of a patient from incident light allows performance of an electroretinogram in compliance with standard ISCEV guidelines for a scotopic test phase of an ERG while allowing safe monitoring of the patient's vital functions during anaesthetic.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single assembly, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A light shielding system configured to shield at least one eye of a patient from incident light for an electroretinogram comprising a substantially lighttight shielding box enclosing an inner space arranged to receive a handheld Ganzfeld stimulator, the box being mountable over the at least one eye of the patient;
   the box including at least one sleeve extending into the box to allow manipulation of the Ganzfeld stimulator;
   wherein the system comprises an adjustable head connection assembly, which is adjustable on a patient's head, the connection assembly including at least one opening allowing the Ganzfeld stimulator to illuminate the at least one eye of the patient.

2. The shielding system according to claim 1, wherein the adjustable head connection assembly is detachably mountable to the shielding box.

3. The shielding system according to claim 1, wherein the adjustable head connection assembly includes an eye contour frame having a flexible face contact side which is arranged to conform to a patient's face.

4. The shielding system according to claim 3, wherein the flexible face contact side of the eye contour frame includes a split rim.

5. The shielding system according to claim 3, wherein the adjustable head connection assembly includes an at least partly flexible cover arranged to avoid incident light between the eye contour frame and the shielding box.

6. The shielding system according to claim 5, wherein the flexible cover forms at least part of a lower side of the shielding box.

7. The shielding system according to claim 5, wherein the flexible cover includes a rigid rim on which rim the shielding box is mountable.

8. The shielding system according to claim 3, wherein the flexible cover is detachably connectable to the eye contour frame.

9. The shielding system according to claim 1, wherein the shielding box includes at least one hatchway for wire access.

10. The shielding system according to claim 1, wherein the system further comprises an infrared camera and a display, the infrared camera being mountable in the inner space of the shielding box and being connectable to the display placed outside of the shielding box.

11. The shielding system according to claim 1, wherein the shielding box comprises a lid.

12. The shielding system according to claim 1, the system further comprising a tripod to which the shielding box is mountable such that the shielding box is adjustable in height.

13. A method of shielding at least one eye of a patient from incident light for an electroretinogram comprising the steps of:
- providing a light shielding system according to claim 1;
- adjusting the adjustable head connection assembly on a patient's head such that an opening of the head connection assembly is laid over at least one eye of the patient;
- providing a hand-held Ganzfeld stimulator in the inner space of the lighttight shielding box and connecting said hand-held Ganzfeld stimulator with the at least one sleeve extending into the box.

14. The method according to claim 13, wherein the shielding box is lowered over the patient's head.

15. The method according to claim 13, wherein the shielding box is detachably connected to the adjustable head connection assembly after adjusting the adjustable head connection assembly on the patient's head.

* * * * *